United States Patent
Kobayashi

(10) Patent No.: US 10,359,109 B2
(45) Date of Patent: Jul. 23, 2019

(54) SHIFT DEVICE

(71) Applicant: KABUSHIKI KAISHA TOKAI-RIKA-DENKI-SEISAKUSHO, Aichi-ken (JP)

(72) Inventor: Takafumi Kobayashi, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 295 days.

(21) Appl. No.: 15/335,714

(22) Filed: Oct. 27, 2016

(65) Prior Publication Data

US 2017/0130821 A1  May 11, 2017

(30) Foreign Application Priority Data

Nov. 5, 2015  (JP) .................................. 2015-217747

(51) Int. Cl.
*F16H 59/02* (2006.01)
*F16H 61/24* (2006.01)

(52) U.S. Cl.
CPC ......... *F16H 59/0278* (2013.01); *F16H 61/24* (2013.01); *F16H 2061/247* (2013.01)

(58) Field of Classification Search
CPC ....... F16H 59/0278; F16H 61/24; F16H 59/10
See application file for complete search history.

(56) References Cited

U.S. PATENT DOCUMENTS

| | | | |
|---|---|---|---|
| 3,665,785 A | 5/1972 | Moal | |
| 3,998,109 A * | 12/1976 | O'Brien | F16H 59/10 74/473.23 |
| 6,421,881 B1 * | 7/2002 | Shovlin | F16H 59/02 16/441 |
| 2002/0062709 A1 * | 5/2002 | Suzuki | F16H 59/02 74/523 |

(Continued)

FOREIGN PATENT DOCUMENTS

| | | |
|---|---|---|
| CN | 203202196 U | 9/2013 |
| CN | 203335815 U | 12/2013 |

(Continued)

OTHER PUBLICATIONS

EPO Machine Translation of JPH0954626 (A), Yoshida et al., Feb. 25, 1997. (Year: 1997).*

(Continued)

*Primary Examiner* — Vinh Luong
(74) *Attorney, Agent, or Firm* — Roberts Mlotkowski Safran Cole & Calderon P.C.

(57) ABSTRACT

A shift device including: a shift body that is moved to change a shift position; a grip section that is provided to the shift body, and that is grippable by an occupant; a body member that is provided to the grip section; a first covering member that is provided to the grip section, that covers the body member, and that is provided with an engagement portion engaging with the body member; and a second covering member that is provided to the grip section, that covers the body member, and that is provided with an (Continued)

anchoring portion, the anchoring portion engaging with the engagement portion, being anchored to at least one out of the body member or the first covering member, and restraining release of engagement of the engagement portion with the body member.

8 Claims, 2 Drawing Sheets

(56) References Cited

U.S. PATENT DOCUMENTS

| | | | |
|---|---|---|---|
| 2005/0011293 A1* | 1/2005 | Kondou | F16H 59/0278 74/473.1 |
| 2014/0123798 A1* | 5/2014 | Miyamoto | F16H 59/0278 74/473.3 |
| 2014/0237810 A1 | 8/2014 | Blanc et al. | |
| 2015/0362064 A1* | 12/2015 | Nishijima | G05G 1/06 74/473.3 |

FOREIGN PATENT DOCUMENTS

| | | | | |
|---|---|---|---|---|
| JP | H06280974 A | * | 10/1994 | ......... F16H 59/0278 |
| JP | H09-54626 A | | 2/1997 | |
| JP | 2004203163 | * | 7/2004 | |
| JP | 2014-100946 A | | 6/2014 | |
| TW | 255865 B | | 9/1995 | |
| WO | 2010-039845 A2 | | 4/2010 | |
| WO | WO 2013002101 A1 | * | 1/2013 | |
| WO | 2013-054021 A1 | | 4/2013 | |

OTHER PUBLICATIONS define body member—Google Search, google.com., Feb. 10, 2019. (Year: 2019).*
EPO Machine Translation of JP 2004203163 (A), Aoyama, Jul. 22, 2004 (Year: 2004).*
Extended European Search Report issued in the corresponding EP Application No. 16195479.7 dated Mar. 10, 2017.
Office Action issued in the corresponding Japanese Application No. 2015-217747 dated Jan. 31, 2017.

* cited by examiner

SHIFT DEVICE

CROSS-REFERENCE TO RELATED APPLICATION

This application is based on and claims priority under 35 USC 119 from Japanese Patent Application No. 2015-217747 filed on Nov. 5, 2015, the disclosure of which is incorporated by reference herein.

BACKGROUND

Technical Field

The present disclosure relates to a shift device in which a covering member covers a body member in a grip section of a shift body.

Related Art

Japanese Patent Application Laid-Open (JP-A) No. H09-54626 describes a shift lever in which a knob section is covered by a front face covering and a rear face covering.

The front face covering and the rear face covering are fitted and adhered to each other, and are fixed to the knob section.

In such a shift lever, it would be desirable to be able to restrain the front face covering and the rear face covering from coming away from the knob section.

SUMMARY

In consideration of the above circumstances, the present disclosure provides a shift device capable of restraining a first covering member and a second covering member from coming away from a body member.

A shift device of a first aspect of the present disclosure includes a shift body that is moved to change a shift position, a grip section that is provided to the shift body and that is grippable by an occupant, a body member that is provided to the grip section, a first covering member that is provided to the grip section, that covers the body member, and that is provided with an engagement portion engaging with the body member, and a second covering member that is provided to the grip section, that covers the body member, and that is provided with an anchoring portion. The anchoring portion engages with the engagement portion, is anchored to at least one out of the body member or the first covering member, and restrains release of engagement of the engagement portion with the body member.

A shift device of a second aspect of the present disclosure is the shift device of the first aspect, wherein the engagement portion penetrates through, and engages with, the body member.

A shift device of a third aspect of the present disclosure is the shift device of the first aspect or the second aspect, wherein the anchoring portion penetrates through, and engages with, the engagement portion.

A shift device of a fourth aspect of the present disclosure is the shift device of any one of the first aspect to the third aspect, wherein the body member anchors the anchoring portion when an external force acts toward a side that releases engagement of the engagement portion with the body member.

A shift device of a fifth aspect of the present disclosure is the shift device of any one of the first aspect to the fourth aspect, wherein the anchoring portion fits between the body member and the engagement portion.

In the shift device of the first aspect of the present disclosure, the grip section of the shift body is grippable by an occupant, and the shift body is moved to change a shift position. The first covering member and the second covering member also cover the body member in the grip section.

The engagement portion of the first covering member engages with the body member, and the anchoring portion of the second covering member engages with the engagement portion and is also anchored to at least one out of the body member or the first covering member, and restrains release of engagement of the engagement portion with the body member. This thereby enables the first covering member and the second covering member to be restrained from coming away from the body member.

In the shift device of the second aspect of the present disclosure, the engagement portion penetrates through, and engages with, the body member. Accordingly, when the anchoring portion has engaged with the engagement portion, release of engagement of the engagement portion with the body member can be effectively restrained.

In the shift device of the third aspect of the present disclosure, the anchoring portion penetrates through, and engages with, the engagement portion. Accordingly, when the anchoring portion is anchored to at least one out of the body member or the first covering member, release of engagement of the anchoring portion with the engagement portion can be effectively restrained.

In the shift device of the fourth aspect of the present disclosure, the body member anchors the anchoring portion when an external force acts toward a side that releases engagement of the engagement portion with the body member. Accordingly, release of engagement of the engagement portion with the body member can be effectively restrained.

In the shift device of the fifth aspect of the present disclosure, the anchoring portion is fitted between the body member and the anchoring portion. Accordingly, play in the engagement portion and the anchoring portion with respect to the body member can be suppressed, and play in the first covering member and the second covering member with respect to the body member can be suppressed.

BRIEF DESCRIPTION OF THE DRAWINGS

Exemplary embodiments of the present disclosure will be described in detail based on the following figures, wherein.

DETAILED DESCRIPTION

Figure 1:
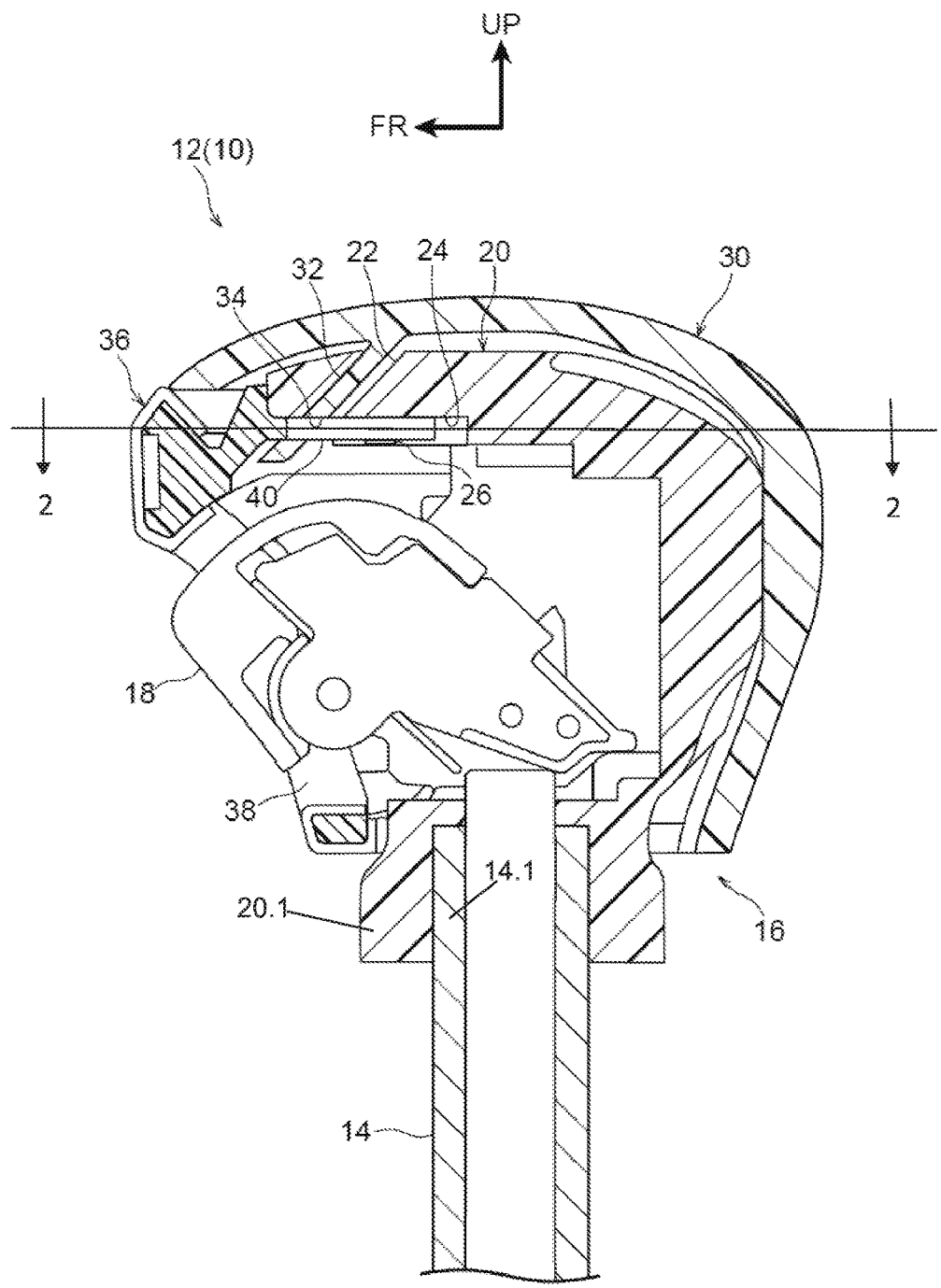
FIG. 1 is a cross-section taken along a vertical plane at a center of a shift lever device in a left-right direction of the shift lever device and illustrating relevant elements of the shift lever device according to an exemplary embodiment of the present disclosure, as viewed from the left.
Figure 2:
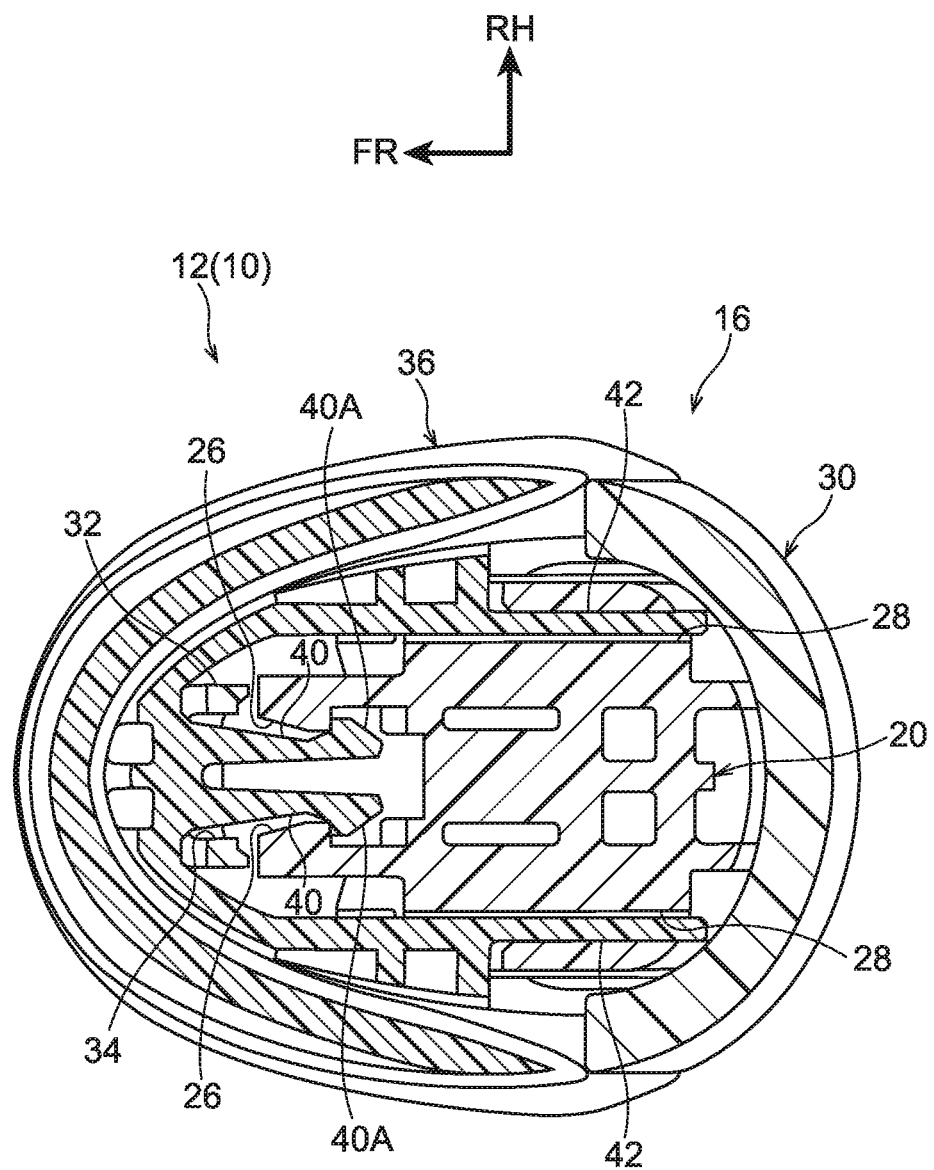
FIG. 2 is a cross-section along the section line 2-2 in FIG. 1 illustrating relevant elements of the shift lever device according to the exemplary embodiment of the present disclosure, as viewed from above.

FIG. 1 is a cross-section illustrating relevant elements of a shift lever device 10 serving as a shift device according to an exemplary embodiment of the present disclosure, as viewed from the left. FIG. 2 is a cross-section illustrating relevant elements of the shift lever device 10, as viewed from above. Note that in the drawings, the arrow FR indicates the front of the shift lever device 10, the arrow RH indicates the right of the shift lever device 10, and the arrow UP indicates the upper side of the shift lever device 10.

The shift lever device 10 according to the present exemplary embodiment is what is called a straight shift device. The shift lever device 10 is floor-mounted and installed to a floor section of a vehicle cabin at the vehicle width direction inside of a driver seat (not illustrated in the drawings) of a vehicle (automobile). The front, right, and upper side of the shift lever device 10 respectively face the front, right, and upper side of the vehicle.

The shift lever device 10 is provided with a housing (not illustrated in the drawings), this being on a vehicle body side. The housing is fixed to the floor section of the vehicle cabin.

As illustrated in FIG. 1 and FIG. 2, a lower end (base end) of a substantially rod shaped lever 12, serving as a shift body, is supported by the inside of the housing, the lever 12 extends out from the housing toward the upper side, and lever 12 can be pivoted (moved) about its lower end along a front-rear direction (along one direction). A shift position can be changed by pivoting the lever 12, and, for example, the lever 12 is capable of being placed in a P position (park position), an R position (reverse position), an N position (neutral position), and a D position (drive position) on progression from a front side toward a rear side.

A detent mechanism (not illustrated in the drawings), serving as a restricting member, is provided inside the housing. The detent mechanism restricts the lever 12 from pivoting from a particular shift position (for example, the P position).

A circular tube shaped lever body 14, serving as a body section, is provided to the lever 12. The lever body 14 is disposed on the lever 12, except for at an upper end portion 14.1 (leading end portion) in the length direction of the lever 12.

A substantially spherically shaped knob 16, serving as a grip section, is provided to the upper end portion of the lever 12. A lower portion of the knob 16 is fixed to an upper end portion of the lever body 14. The knob 16 is configured so as to be grippable by an occupant (driver) of the vehicle, and so that an occupant is able to pivot-operate the lever 12 by gripping the knob 16.

A button 18, serving as an operation member, is provided inside the knob 16 so as to be capable of pivoting (moving). The button 18 is exposed at a front side of the knob 16 such that an occupant is able to pivot-operate the button 18. The button 18 is mechanically or electrically coupled to the detent mechanism. By pivot-operating the button 18, restriction on the lever 12 from pivoting from a particular shift position by the detent mechanism is released, enabling the lever 12 to be pivot-operated from a particular shift position.

A substantially spherical container shaped knob body 20 constitutes an inner core of the knob 16. A lower portion 20.1 of the knob body 20 is fixed to the upper end portion 14.1 of the lever body 14, and the knob 16 is thereby fixed to the lever body 14. The button 18 is provided inside the knob body 20, and the inside of the knob body 20 is open to the front.

A rectangular shaped engagement hole 22, serving as an engaged portion, is formed penetrating a left-right direction center portion at an upper front side portion of the knob body 20. The engagement hole 22 penetrates the knob body 20 along a direction toward the front side on progression toward a lower side, and the engagement hole 22 has an uninterrupted (closed) periphery. An inner face on the upper front side of the knob body 20 configures a flat plane shaped fitting face 24, serving as a fitted portion. The fitting face 24 is disposed perpendicular to an up-down direction (the axial direction of the lever body 14) and has the engagement hole 22 opened therein.

A pair of trapezoidal column shaped anchor projections 26, serving as anchored portions, are integrally provided to the fitting face 24 at a rear side of the engagement hole 22. The pair of anchor projections 26 oppose each other in the left-right direction. The anchor projections 26 project out from the fitting face 24 toward the lower side, and rear faces of the anchor projections 26 are disposed perpendicular to the front-rear direction (a direction at a right angle to the axis of the lever body 14).

Guide holes 28, serving as guide portions, are formed respectively penetrating a left side portion and a right side portion at an upper rear side portion of the knob body 20. The guide holes 28 penetrate the knob body 20 along the front-rear direction (a direction at a right angle to the axis of the lever body 14).

A rear panel 30, serving as a first covering member configuring a covering member, covers an upper side portion and a rear side portion of the knob body 20. The rear panel 30 has a curved plate shape with a substantially inverted L shaped cross-section in side view, and the rear panel 30 is contacted by the knob body 20. Engagement claws (not illustrated in the drawings), serving as elastic engagement portions, are integrally provided to a left end and a right end of a lower portion of the rear panel 30. The engagement claws elastically engage with the knob body 20 so as to restrain movement of the rear panel 30 toward the rear side with respect to the knob body 20.

A rectangular plate shaped engagement plate 32, serving as an engagement portion, is integrally provided to a left-right direction center portion at an upper front side portion inside the rear panel 30. The engagement plate 32 extends out from the rear panel 30 along a direction toward the front side on progression toward the lower side. The engagement plate 32 penetrates the engagement hole 22 of the knob body 20, and a lower portion of the engagement plate 32 projects out to the lower side of the fitting face 24 of the knob body 20. A rectangular shaped hooking hole 34, serving as a hooking portion, is formed penetrating a lower portion of the engagement plate 32. The hooking hole 34 penetrates the engagement plate 32 along the front-rear direction (a direction at a right angle to the axis of the lever body 14), and the hooking hole 34 has an uninterrupted (closed) periphery.

A front panel 36, serving as a second covering member configuring a covering member, covers a front side portion and both left and right side portions of the knob body 20. The front panel 36 has a curved plate shape with a substantially U shaped cross-section in plan view, and the front panel 36 is contacted by the knob body 20. The outer periphery of the front panel 36 other than at a lower end of the front panel 36 fits together with the outer periphery of the rear panel 30 other than at a lower end of the rear panel 30. An exposure hole 38 is formed penetrating a front side portion of the front panel 36. The exposure hole 38 exposes the button 18 inside the knob body 20 to the front side.

A pair of elongated plate shaped anchor claws 40, serving as anchoring portions, are integrally provided to a left-right direction center portion of an upper portion of the front side portion inside the front panel 36. The pair of anchor claws 40 oppose each other in the left-right direction. The anchor claws 40 extend out from the front panel 36 toward the rear (a direction at a right angle to the axis of the lever body 14). The anchor claws 40 penetrate the hooking hole 34 of the engagement plate 32 of the rear panel 30, and are fitted between the lower face of the hooking hole 34 and the fitting face 24 of the knob body 20. A trapezoidal plate shaped protrusion 40A is integrally provided at a leading end portion of each anchor claw 40. Each protrusion 40A projects out from the respective anchor claw 40 toward the opposite side to the side of the other anchor claw 40. The protrusions 40A of the anchor claws 40 are anchored to the anchor projections 26 of the knob body 20 in an elastically deformed state. Front faces of the respective protrusions 40A are disposed perpendicular to the front-rear direction (a direction at a right angle to the axis of the lever body 14), and make face contact with the rear faces of the anchor projections 26.

A pair of guide columns 42, serving as guided portions, are respectively integrally provided to a left side portion and a right side portion of the upper portion of the front side portion inside the front panel 36. The guide columns 42 extend out from the front panel 36 toward the rear (a direction at a right angle to the axis of the lever body 14) and are inserted into the guide holes 28 of the knob body 20.

Next, explanation follows regarding operation of the present exemplary embodiment.

In the shift lever device 10 of the above configuration, in order to assemble the knob 16, the rear panel 30 is moved obliquely toward the lower front with respect to the knob body 20 such that the engagement plate 32 of the rear panel 30 penetrates the engagement hole 22 of the knob body 20, the engagement claws of the rear panel 30 elastically engage with the knob body 20, and the knob body 20 is covered by the rear panel 30.

The front panel 36 is then moved toward the rear with respect to the knob body 20 such that the guide columns 42 of the front panel 36 are inserted into the respective guide holes 28 of the knob body 20, thereby guiding the movement of the front panel 36 toward the rear with respect to the knob body 20. The anchor claws 40 of the front panel 36 thereby penetrate the hooking hole 34 of the engagement plate 32, and the protrusions 40A are anchored to the anchor projections 26 of the knob body 20 as anchor claws 40 are elastically deformed, such that the knob body 20 is covered by the front panel 36 and the outer periphery of the front panel 36 and the outer periphery of the rear panel 30 are fitted together.

As described above, the anchor claws 40 of the front panel 36 penetrate the hooking hole 34 of the engagement plate 32, and the protrusions 40A of the anchor claws 40 are anchored to the anchor projections 26 of the knob body 20 in a state in which the engagement plate 32 of the rear panel 30 has penetrated the engagement hole 22 of the knob body 20. Thus, the anchor claws 40 restrict penetration of the engagement plate 32 through the engagement hole 22 from being released, and anchoring of the protrusions 40A to the anchor projections 26 is also restricted from being released by face contact between the front faces of the protrusions 40A and the rear faces of the anchor projections 26. Thus, the rear panel 30 and the front panel 36 can be restricted from coming away from the knob body 20, and the need for adhesion between the knob body 20 and the rear panel 30, between the knob body 20 and the front panel 36, and between the outer periphery of the rear panel 30 and the outer periphery of the front panel 36, can be eliminated.

As described above, the engagement plate 32 penetrates the engagement hole 22. Thus, when the anchor claws 40 have penetrated the hooking hole 34, penetration of the engagement plate 32 through the engagement hole 22 can be effectively restricted from being released, and the rear panel 30 can be effectively restricted from coming away from the knob body 20.

As described above, the anchor claws 40 penetrate the hooking hole 34. Thus, when the anchor claws 40 have been anchored to the anchor projections 26, penetration of the anchor claws 40 through the hooking hole 34 can be effectively restricted from being released, and the rear panel 30 can be even more effectively restricted from coming away from the knob body 20.

Moreover, even when an external force acts on the rear panel 30 toward the side that releases penetration of the engagement plate 32 through the engagement hole 22 (i.e. obliquely toward the upper rear), the fitting face 24 of the knob body 20 anchors the anchor claws 40. Thus, penetration of the engagement plate 32 through the engagement hole 22 can be effectively restricted from being released, and the rear panel 30 can be even more effectively restricted from coming away from the knob body 20.

The anchor claws 40 are fitted between the fitting face 24 of the knob body 20 and the lower face of the hooking hole 34. Thus, play in the engagement plate 32 and the anchor claws 40 with respect to the knob body 20 can be suppressed in the up-down direction, and play in the rear panel 30 and the front panel 36 with respect to the knob body 20 can be suppressed in the up-down direction. Moreover, the need to provide a separate configuration for suppressing play in the rear panel 30 and the front panel 36 with respect to the knob body 20 in the up-down direction can be eliminated, and the knob 16 can be made more compact.

Note that in the present exemplary embodiment, the pair of anchor claws 40 are disposed between the pair of anchor projections 26, each anchoring projection 26 projects out toward the side of the other anchoring projection 26, and the protrusion 40A of each anchor claw 40 projects out toward the opposite side to the side of the other anchor claw 40. However, the pair of anchor projections 26 may be disposed between the pair of anchor claws 40, such that each anchoring projection 26 projects out toward the opposite side to the side of the other anchoring projection 26, and the protrusion 40A of each anchor claw 40 projects out toward the side of the other anchor claw 40.

In the present exemplary embodiment, the anchor claws 40 are anchored to the knob body 20. However, it is sufficient for the anchor claws 40 to be anchored to at least one out of the knob body 20 or the rear panel 30.

In the present exemplary embodiment, the engagement plate 32 is provided to the rear panel 30, and the anchor claws 40 are provided to the front panel 36. However, the engagement plate 32 may be provided to the front panel 36, and the anchor claws 40 may be provided to the rear panel 30.

In the present exemplary embodiment, the engagement hole 22 of the knob body 20 extends along a direction toward the front side on progression toward the lower side. However, as long as the engagement plate 32 is insertable, the engagement hole 22 of the knob body 20 may extend along another direction (for example, downward or toward the rear side).

In the present exemplary embodiment, the button 18 is exposed at the front side of the knob 16, and is capable of being operated toward the rear side. However, the button 18 may be exposed at the right side of the knob 16 and capable of operating toward the left side, or the button 18 may be exposed at the left side of the knob 16 and capable of being operated toward the right side.

In the present exemplary embodiment, the shift lever device 10 is floor-mounted and installed to the floor section of a vehicle cabin. However, the shift lever device 10 may be installed to a steering column covering or an instrument panel in the vehicle cabin.

What is claimed is:

1. A shift device comprising:
   a lever that is moved to change a shift position, and that includes a lever body;

a knob that is provided to the lever, and that is grippable by an occupant, the knob including;
  a knob body that constitutes an inner core of the knob, and that includes a lower portion that is fixed to an upper end portion of the lever body;
  a first covering member that covers the knob body, and that is provided with an engagement protrusion engaging with the knob body; and
  a second covering member that covers the knob body, and that is provided with an anchoring protrusion extending out from the second covering member, the anchoring protrusion engaging with the engagement portion protrusion, being anchored to at least the knob body, and restraining release of engagement of the engagement protrusion with the knob body,
wherein the anchoring protrusion and the second covering member are a one-piece construction.

2. The shift device of claim 1, wherein the engagement protrusion penetrates through, and engages with, the knob body.

3. The shift device of claim 1, wherein the anchoring protrusion penetrates through, and engages with, the engagement protrusion.

4. The shift device of claim 1, wherein the knob body anchors the anchoring protrusion when an external force acts toward a side that releases engagement of the engagement protrusion with the knob body.

5. The shift device of claim 1, wherein the anchoring protrusion fits between the knob body and the engagement protrusion.

6. The shift device of claim 1, wherein the knob body includes an anchored member and the anchoring protrusion is anchored to the anchored member.

7. The shift device of claim 6, wherein the anchored member is a claw protrusion.

8. A shift device comprising:
  a lever that is moved to change a shift position, and that includes a lever body;
  a knob that is provided to the lever, and that is grippable by an occupant, the knob including;
    a knob body that constitutes an inner core of the knob, and that includes a lower portion that is fixed to an upper end portion of the lever body;
    a first covering member that covers the knob body, and that is provided with an engagement protrusion engaging with the knob body; and
    a second covering member that covers the knob body, and that is provided with an anchoring protrusion, the anchoring protrusion engaging with the engagement protrusion and being anchored to at least the knob body, and restraining release of engagement of the engagement protrusion with the knob body,
  wherein the engagement protrusion extends out of the first covering member, and the anchoring protrusion extends out from the second covering member in a different direction from that in which the engagement protrusion extends.

* * * * *